United States Patent [19]

Perry

[11] 4,141,801

[45] Feb. 27, 1979

[54] FUEL CELL ANODE ELECTRODE, METHOD OF MAKING THE FUEL CELL ANODE ELECTRODE, AND FUEL CELL CONTAINING THE FUEL CELL ANODE ELECTRODE

[75] Inventor: John Perry, Tinton Falls, N.J.

[73] Assignee: The United States of America as represented by the Secretary of the Army, Washington, D.C.

[21] Appl. No.: 860,661

[22] Filed: Dec. 15, 1977

[51] Int. Cl.$^2$ .............................................. C25D 11/00
[52] U.S. Cl. .................................. 204/2.1; 204/56 R
[58] Field of Search ...................... 429/42, 44, 40, 27; 252/425.3; 204/56 R, 114, 53, 2.1

[56] References Cited

U.S. PATENT DOCUMENTS

| 3,252,839 | 5/1966 | Langer et al. | 429/42 |
| 3,297,489 | 1/1967 | Feng et al. | 429/40 |
| 3,457,113 | 7/1969 | Deibert | 429/42 X |
| 3,877,994 | 4/1975 | Chottiner | 429/42 |

*Primary Examiner*—Anthony Skapars
*Attorney, Agent, or Firm*—Sheldon Kanars; Roy E. Gordon

[57] ABSTRACT

A fuel cell anode electrode for use in fuel cells utilizing fuel electrolyte mixtures of methanol in potassium hydroxide electrolyte and ethylene glycol in potassium hydroxide electrolyte is made by pressing a paste mix of noble metal powder, graphite, and teflon onto a screen current collector, drying the electrode so formed, cathodically charging the electrode at a current density of about 2½ to 10 mA/cm$^2$ for about 2 to about 6 minutes to deposit lead through electrolysis using a saturated solution of lead chloride, anodically charging the electrode for about 2 to about 12 minutes to oxidize the lead to lead dioxide, washing the electrode with distilled water, and drying the electrode.

9 Claims, No Drawings

FUEL CELL ANODE ELECTRODE, METHOD OF MAKING THE FUEL CELL ANODE ELECTRODE, AND FUEL CELL CONTAINING THE FUEL CELL ANODE ELECTRODE

The invention described herein may be manufactured, used, and licensed by or for the Government for governmental purposes without the payment to me of any royalty thereon.

BACKGROUND OF THE INVENTION

This invention relates in general to fuel cells, and in particular, to a fuel cell anode electrode, to a method of making the fuel cell anode electrode, and to a fuel cell including the fuel cell anode electrode.

Methanol-air and ethylene glycol-air fuel cells have been investigated for potential use as power sources in military equipments. Electrochemical oxidation of these fuels in cells have demonstrated good performance.

However, the cost and quantity of the noble metal catalyst required for fuel cell anode electrode fabrication has limited its acceptance as a power source. That is, the current state of the art of fuel cell electrode anodes used in methanol-air and ethylene glycol-air fuel cells operating at ambient temperatures of about 22° C calls for platinum and palladium catalyst loadings totaling 10 to 12 mg/cm$^2$.

SUMMARY OF THE INVENTION

The general object of this invention is to provide a fuel cell anode electrode. A further object of the invention is to provide such an electrode for use in methanol-air and ethylene glycol-air fuel cells operating at ambient temperatures of about 22° C. A still further object of the invention is to provide such a fuel cell electrode in which the catalyst loading of noble metal catalyst is reduced without sacrificing performance characteristics in terms of current density.

It has now been found that the foregoing objects can be attained and a suitable fuel cell anode fabricated by pressing a paste mix of noble metal powder, graphite, and teflon onto a screen current collector, drying the electrode, cathodically charging the electrode at a current density of about 2½ to 10 mA/cm$^2$ for about 2 to about 6 minutes to deposit lead through electrolysis using a saturated solution of lead chloride, anodically charging the electrode for about 2 to 12 minutes to oxidize the lead to lead dioxide, and washing the electrode with distilled water and then drying.

The electrode thus prepared is capable of delivering current densities equal to that of electrodes containing large quantities of platinum and palladium catalyst. The electrode thus prepared also includes about 15 percent by weight noble metal, about 65 percent by weight graphite, about 3 percent by weight lead dioxide, about 17 percent by weight teflon, or polytetrafluoroethylene and has a total noble metal catalyst loading of approximately 2.2 mg/cm$^2$ of platinum black. This represents a reduction by 88 percent in total noble metal catalyst loading.

DESCRIPTION OF THE PREFERRED EMBODIMENT

A fuel cell anode electrode measuring 4.57 cm × 8.38 cm is made by weighing out 0.192 gram of platinum black powder, 0.8643 gram of graphite powder and adding to 50 cc of water. The solution is stirred for several minutes. After stirring, 2.5 cc of 30 percent teflon solution is added and the solution boiled until the powder coagulates. The mixture is then washed three times with water. After the final washing, the water is drained off and a paste is formed with the coagulated catalyst material. The past is rolled onto both sides of a silver or nickel screen current collector measuring 4.57 cm × 8.38 cm. The electrode is dried for four hours at about 90° C. The lead dioxide (PbO$_2$) is deposited through electrolysis using a saturated solution of lead chloride. The electrode is first cathodically charged at a current of 0.5 Ampere (6.5 mA/cm$^2$) for six minutes to deposit lead on the electrode and then anodically charged for 12 minutes at 0.5A to oxidize the lead to lead dioxide. The electrode is then washed several times with distilled water and dried in an oven at 90° C. The noble metal catalyst loading, platinum black, is 2.4 mg/cm$^2$.

The fuel cell anode thus prepared is then evaluated in half cells, anode versus saturated calomel electrode (SCE), and in completed cells, anode versus air breathing cathode electrodes. Electrolyte fuel solutions or anolyte used in the test cells is 3 molar methanol plus 6 molar potassium hydroxide. Anode half cell potentials (anode vs SCE) of electrodes containing anodically deposited lead dioxide average 0.940 V at current densities of 10 mA/cm$^2$ at temperatures of 21.5° C, when operated in electrolyte solutions containing 3 molar methanol plus 6 molar potassium hydroxide. The performance obtained from the above electrode with 2.4 mg/cm$^2$ of platinum catalyst plus anodic lead dioxide is similar to electrodes containing noble metal catalyst loadings of 3 mg/cm$^2$ of platinum plus 7 mg/cm$^2$ of palladium when tested under similar test conditions.

Performance of single cells fabricated with an anode containing the low platinum content of 2.4 mg/cm$^2$ and anodic PbO$_2$ is compared with cells containing anodes with platinum and palladium loading of 10 to 12 mg/cm$^2$. The single cells with the low platinum loadings and anodic PbO$_2$ give performances equal to cells with anodes containing high noble metal loadings of platinum and palladium. Both types of cells are tested using electrolyte fuel solutions of 3 molar methanol plus 6 molar potassium hydroxide and 3 molar ethylene glycol plus 6 molar potassium hydroxide. The single cells are of the bi-cell design, complete with two air breathing silver amalgam catalyst cathodes. Such cathodes and their method of fabrication, which do not constitute part of this invention, are fully described in the article "Low Power Methanol Fuel Cells" by J. Perry, Jr. and M. Klein appearing at page 178 to page 180 of the Proceedings of the 26 Power Sources Symposium, June 21 to June 24, 1976. The fuel cell anode electrode is centrally located in a cell frame.

In fabricating the fuel cell anode electrode according to the invention, the noble metal ingredient of the paste mix is a powder of platinum black, palladium black, and combinations of platinum black and palladium black. Trace amounts of other noble metals such as ruthenium, rhodium and irridium may also be included in the paste mix. The amount of noble metal used must give the electrode a catalyst loading of from about 1.0 mg/cm$^2$ to about 2.4 mg/cm$^2$.

The graphite powder ingredient of the paste mix serves as a filler and must be present in an amount so that the electrode structure contains about 65 to about 75 weight percent of graphite.

Teflon serves as a binder in the paste mix and must be present in an amount sufficient so that the electrode structure will be constituted of about 10 to about 17 weight percent teflon.

The screen current collector onto which the paste mix is rolled can be an electrically conductive material that will not react with either the fuel or the electrolyte. In the case where an alkaline electrolyte is used, nickel or silver is a suitable screen material. In the instance where an acid electrolyte is used, gold is a suitable screen material.

The electrode is then dried for about one to two hours at about 100° C.

In cathodically charging the fuel cell anode electrode, the current density may be varied from about 2.5 to about 10.0 mA/cm$^2$ for about 2 to about 6 minutes using a saturated solution of an inorganic salt of lead such as lead chloride or lead nitrate.

The fuel cell anode electrode is then anodically charged for about 2 to about 12 minutes to oxidize the lead to lead dioxide.

I wish it to be understood that I do not desire to be limited to the exact details of construction shown and described, for obvious modifications will occur to a person skilled in the art.

What is claimed is:

1. Method of making a fuel cell anode electrode including the steps of:
    (a) pressing a paste mix of noble metal powder, graphite powder and teflon onto a screen current collector to form an electrode,
    (b) drying the electrode,
    (c) cathodically charging the electrode at a current density of about 2.5 to about 10 mA/cm$^2$ for about 2 to about 6 minutes to deposit lead through electrolysis using a saturated solution of lead chloride,
    (d) anodically charging the electrode for about 2 to about 12 minutes to oxidize the lead to lead dioxide, and
    (e) washing the electrode with distilled water and then drying.

2. Method according to claim 1 wherein the noble metal is selected from the group consisting of platinum black, palladium black, combinations of platinum black and palladium black, platinum black with traces of ruthenium, palladium black with traces of ruthenium, and combinations of platinum black and palladium black with traces of ruthenium.

3. Method according to claim 2 wherein the noble metal is platinum black.

4. Method according to claim 2 wherein the noble metal is palladium black.

5. Method according to claim 2 wherein the noble metal is combinations of platinum black and palladium black.

6. Method according to claim 2 wherein the noble metal is platinum black with traces of ruthenium.

7. Method according to claim 2 wherein the noble metal is palladium black with traces of ruthenium.

8. Method according to claim 2 wherein the noble metal is combinations of platinum black and palladium black with traces of ruthenium.

9. Method of making a fuel cell anode electrode including the steps of:
    (a) pressing a paste mix of platinum black powder, graphite powder and teflon onto a nickel screen to form an electrode,
    (b) drying the electrode for about four hours at about 90° C,
    (c) cathodically charging the electrode at a current density of about 6.5 mA/cm$^2$ for about six minutes to deposit lead on the electrode through electrolysis using a saturated solution of lead chloride,
    (d) anodically charging the electrode for about 12 minutes at 0.5A to oxidize the lead to lead dioxide, and
    (e) washing the electrode with distilled water and drying in an oven at about 90° C.

* * * * *